(12) United States Patent
Wardenaar et al.

(10) Patent No.: US 10,257,048 B2
(45) Date of Patent: Apr. 9, 2019

(54) METHOD AND USER INTERFACE CONTROLLING COMMUNICATIONS AND CONTENT FROM SOURCES

(75) Inventors: Matthew Jacob Wardenaar, Sherman Oaks, CA (US); Basil Badawiyeh, Santa Clara, CA (US); Roger Yeh, San Marino, CA (US)

(73) Assignee: InterDigital CE Patent Holdings, Paris (FR)

(*) Notice: Subject to any disclaimer, the term of this patent is extended or adjusted under 35 U.S.C. 154(b) by 775 days.

(21) Appl. No.: 14/237,230

(22) PCT Filed: Aug. 9, 2012

(86) PCT No.: PCT/US2012/050159
§ 371 (c)(1),
(2), (4) Date: Apr. 4, 2014

(87) PCT Pub. No.: WO2013/023066
PCT Pub. Date: Feb. 14, 2013

(65) Prior Publication Data
US 2014/0229840 A1    Aug. 14, 2014

Related U.S. Application Data

(60) Provisional application No. 61/522,170, filed on Aug. 10, 2011.

(51) Int. Cl.
*H04L 12/24* (2006.01)
*H04N 21/45* (2011.01)
(Continued)

(52) U.S. Cl.
CPC .......... *H04L 41/22* (2013.01); *G06F 3/04883* (2013.01); *G06Q 10/107* (2013.01);
(Continued)

(58) Field of Classification Search
CPC .. G06F 3/0484; G06F 3/0482; G06F 3/04847; G06F 3/04883; H04L 21/22;
(Continued)

(56) References Cited

U.S. PATENT DOCUMENTS 5,907,836 A * 5/1999 Sumita ................ G06F 17/3061
707/754
9,098,856 B2 * 8/2015 Sinn ........................ G06Q 30/02
(Continued)

FOREIGN PATENT DOCUMENTS

CN    1460363 A    12/2003
CN    1579089 A    2/2005
(Continued)

OTHER PUBLICATIONS

International Search Report and Written Opinion for PCT/US12/50159 dated Oct. 9, 2012 (7 pages).

*Primary Examiner* — Mandrita Brahmachari
(74) *Attorney, Agent, or Firm* — Volpe and Koenig, P.C.

(57) ABSTRACT

The present disclosure is directed towards managing communications from different sources is described where such a management operation can be controlled using a user interface. Sources are selected using the user interface such that communications concerning a specified subject are received from such sources. The user interface can also be used to specific the amount of context/communications that come from different sources concerning the specified subject.

8 Claims, 11 Drawing Sheets

(51) Int. Cl.
*H04N 21/462* (2011.01)
*H04N 21/475* (2011.01)
*H04N 21/4782* (2011.01)
*H04N 21/4788* (2011.01)
*G06Q 10/10* (2012.01)
*G06F 3/0488* (2013.01)

(52) U.S. Cl.
CPC ..... *H04N 21/4532* (2013.01); *H04N 21/4622* (2013.01); *H04N 21/4755* (2013.01); *H04N 21/4782* (2013.01); *H04N 21/4788* (2013.01)

(58) Field of Classification Search
CPC ............. G06Q 10/107; H04N 21/4532; H04N 21/4622; H04N 21/4755; H04N 21/4782; H04N 21/4788
USPC ......................................................... 715/736
See application file for complete search history.

(56) References Cited

U.S. PATENT DOCUMENTS

| | | |
|---|---|---|
| 2002/0140728 A1 | 10/2002 | Zimmerman |
| 2003/0084448 A1 | 5/2003 | Soundararajan |
| 2004/0012637 A1* | 1/2004 | Alford, Jr. .......... G06F 11/3466 715/772 |
| 2004/0154022 A1 | 8/2004 | Boss et al. |
| 2005/0010877 A1 | 1/2005 | Udler |
| 2006/0106846 A1 | 5/2006 | Schulz et al. |
| 2006/0224570 A1* | 10/2006 | Quiroga ................ G06F 17/278 |
| 2007/0094259 A1 | 4/2007 | Shi |
| 2007/0191034 A1 | 8/2007 | Lee et al. |
| 2008/0201434 A1 | 8/2008 | Holmes et al. |
| 2008/0209339 A1 | 8/2008 | Macadaan et al. |
| 2009/0113346 A1 | 4/2009 | Wickramasuriya et al. |
| 2012/0290637 A1* | 11/2012 | Perantatos ............ G06Q 10/10 709/203 |
| 2013/0041893 A1* | 2/2013 | Strike ................. G06F 17/3089 707/723 |

FOREIGN PATENT DOCUMENTS

| | | |
|---|---|---|
| CN | 1629884 A | 6/2005 |
| CN | 101611398 | 12/2009 |
| EP | 2226719 | 9/2010 |
| JP | H08235088 A | 9/1996 |
| JP | 2007215171 A | 8/2007 |

* cited by examiner

METHOD AND USER INTERFACE CONTROLLING COMMUNICATIONS AND CONTENT FROM SOURCES

CROSS-REFERENCE TO RELATED APPLICATIONS

This application claims the benefit, under 35 U.S.C. § 365 of International Application PCT/US2012/050159, filed Aug. 9, 2012, which was published in accordance with PCT Article 21(2) on Feb. 14, 2013 in English and which claims the benefit of U.S. provisional application No. 61/522,170, filed Aug. 10, 2011.

FIELD OF THE INVENTION

The present disclosure relates generally to communication networks, and more specifically to a user interface that is used for managing the receipt of communications from different sources where such communications concern a specific subject.

BACKGROUND OF THE INVENTION

When a user receives communications and content from various sources, the user may not always be able to manage how much content is received from a particular source. Moreover, a user may have a preference for a subject or context of content from a particular source, but there is not a simple means as to how to make such an association without either permitting every communication come from the particular source or filtering out every communication from the specific source.

SUMMARY OF THE INVENTION

A method and apparatus for managing communications from different sources is described where such a management operation can be controlled using a user interface. Sources are selected using the user interface such that communications concerning a specified subject are received from such sources. The user interface can also be used to specific the amount of context/communications that come from different sources concerning the specified subject.

DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

DESCRIPTION OF THE PREFERRED EMBODIMENTS

For purposes of this specification, the term "electronic communication" can be a communication from a first user to a second user which can be transmitted as an electronic mail, text message, short message service, multimedia message service, posting on a social network service such as FACEBOOK, tweet on a service such as TWITTER, photo, blog posting, instant message, video, audio, message posting, voice message, and the like. Content can be audio, video, pictures, text, and a combination of thereof a specific context/subject. Also, the term "context" in this specification covers terms such as subject, category, topic, subject matter, and the like.

Users can be known as being linked or connected when a first user and a second user are "FRIENDS" of each other through a social networking service, where the first and second users are listed on the same list of a third user, a first and second user are grouped together in the same category either implicitly or explicitly with each other's permission, a first and second user are grouped together in the same category either implicitly or explicitly by a third party, and the like.

Figure 1:
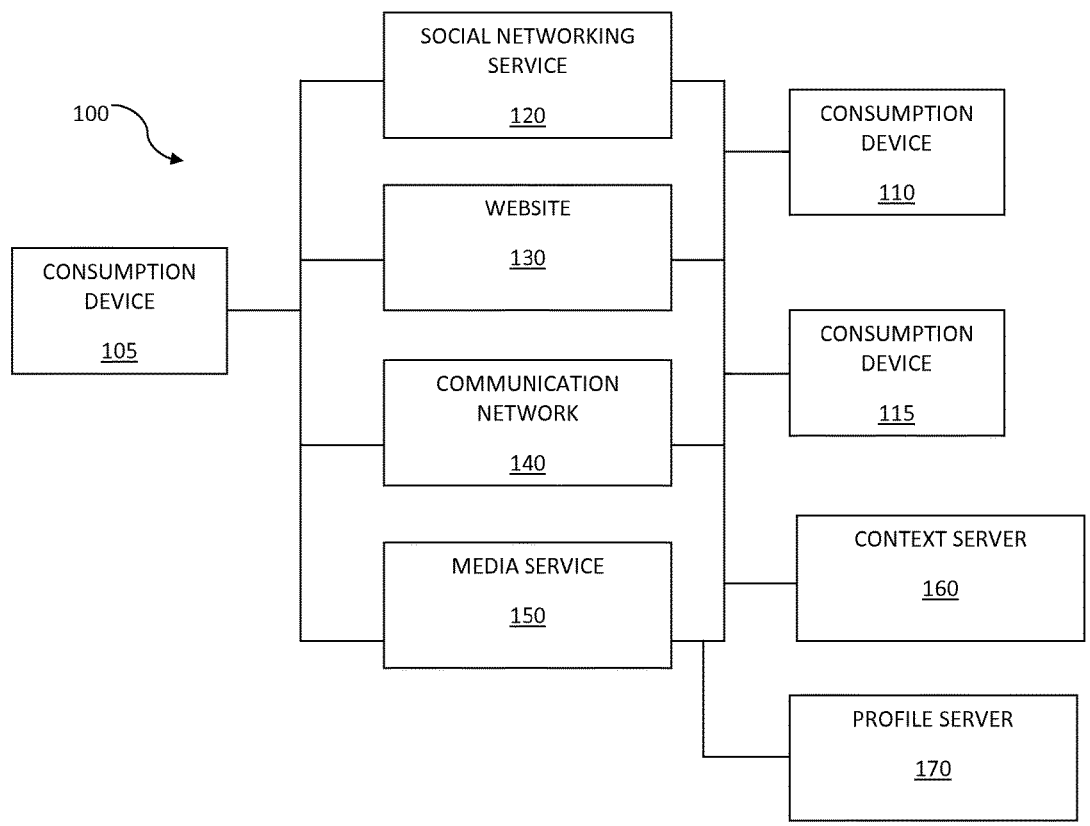
FIG. 1 is a block diagram of an exemplary system transmitting communications between users in accordance with an embodiment of the present disclosure.

FIG. 1 is an exemplary embodiment of a system 100 in accordance with the present disclosure. Consumption device 105 represents a device such as a computer, set top box, tablet, television, phone, personal access device, gateway, and the like that is used to communicate an electronic communication to other devices such as consumption device 110 or consumption device 115.

The electronic communications between users operating consumption devices 105, 110, and 115 can take place through various communication services such as social network service 120. Examples of social networking services include, but are not limited to, FACEBOOK, MYSPACE, LINKEDIN, and the like. Electronic communications between users can also take place via a website 130 and/or a communication network 140 such as, and not limited to, a telephone connection, satellite, connection, cellular network, WI-FI Digital Subscriber Line (DSL), Internet communication, and the like. A media service 150, but not limited to, such as NETFLIX, M-GO, AMAZON CLOUD SERVICE, ITUNES, PANDORA, and the like can also be used to communicate electronic communications between users who use devices such as consumption devices 105, 110, and 115.

Context server 160 can be implemented as a device that determines a context from an electronic communication that is transmitted from a first user to a second user when using devices such as consumption devices 105, 110, 115, where electronic messages can be forwarded, intercepted, and the like by context server 160. A context of an electronic message can be determining a topic/subject of a particular message although other characteristics of an electronic message can be determined. For example, an electronic message where a user writes something such as "I like Beagles" would be about have a subject that concerns dogs while a message stating "IRON MAN 2 is great" can indicate that the electronic communication is about a movie. Note, the term "context" incorporates terms such as subject, category, topic, subject matter, and the like.

Context server 160 can also utilize hash tags "#" or other kind of indication identifies that an electronic message has certain subject. For example, an electronic communication with an indication "#dogs" identifies that the communication is about "DOGS" while an indication "#baseball" indentifies that the communication is about "BASEBALL". Other indicators can be used in accordance with the described exemplary embodiments.

The determination of a context (subject) of an electronic message can be done taking an electronic message and breaking down the sentences in such a message into a series of keywords which are mapped to topics. That is, each sentence is processed to eliminate stop words where the remaining words are denoted as being keywords. The stop words are commonly used words that do not add to the semantic meaning of a sentence (e.g. of, on, is, an, the, etc.). Stop word lists for English language are well known. A pre-processing step, which can be part of having context server 160 read the stop words from such a list and removes them from the text stream.

The keywords are can be mapped to a series of subject or topics (as query terms) by using a predetermined thesaurus database that associates certain keywords with a particular topic. This database can be set up where a limited selection of topics are defined (such as particular people, subjects, and the like) and various keywords are associated with such topics by using a comparator that attempts to map a keyword against a particular subject. For example, thesaurus database (such as WordNet and the Yahoo Open Directory project) can be set up where the keywords such as money, stock, market, are associated with the topic "finance". Likewise, keywords such as President of the United States, 44th President, President Obama, Barack Obama, are associated with the topic "Barack Obama". Other subjects can be determined from keywords using similar approaches for topic determination. Another method for determining could use Wikipedia (or similar) knowledge base where content is categorized based on topics. Given a keyword that has an associated topic in Wikipedia, a mapping of keyword to topics can be obtained for the purposes of creating a thesaurus database, as described above.

Once such subjects are determined for each sentence, such sentences can be represented in the form of: <topic_1: weight_1; topic_2; weight_2, . . . , topic_n,weightN,ne_1, ne_2, . . . , ne_m>.

Topic_i is the topic that is identified based on the keywords in a sentence, weight_i is a corresponding relevance, Ne_i is the named entity that is recognized in the sentence. Named entities refer to people, places and other proper nouns in the sentence which can be recognized using grammar analysis. These weights can then be used for determining a user profile where topics with a higher weight are more likely positively correlated to a user's preferences that a topic with a lower weight.

It is possible that some entity is mentioned frequently but is indirectly referenced through the use of pronouns such as "he, she, they". If each sentence is analyzed separately such pronouns will not be counted because such words are in the stop word list. The word "you" is a special case since it is used frequently. The use of name resolution will help assign the term "you" to a specific keyword/topic referenced in a previous/current sentence. Otherwise, "you" will be ignored if it can't be referenced to a specific term. To resolve this issue the name resolution can be done before the stop word removal. Other implementations are possible in accordance with the disclosed exemplary embodiments.

In an optional embodiment, the contexts that are derived by context server 160 can be automatically rendered as graphical elements that are represented in association with a user profile. That is, if the developed contexts represent different topics, such topics can be shown as icons, pictures, and the like when a user's profile is displayed using information from profile server 170 where such graphical elements can be associated with a user profile automatically. Such elements can be selected by a user as well, for example, where the user has previously specified a particular interest such as "baseball", a graphical element for a baseball can be shown with the user's profile.

From the development of the subject of an electronic communication from server 160, a profile can be determined for respective users by profile server 170. That is, the context of the electronic communications sent from a first user to a second user can indicate topics of interest that appeal to the first user. Such contexts can be the topics of the electronic messages transmitted from the first user to the second user. A profile for a user can be generated using implicit techniques based on approaches similar to those described for context server 160, the type of media consumed by a user, and the like. Profiles can also be generated by explicit techniques where a user specifies their interests via a survey or other means of specifying preferences. A combination of implicit and explicit techniques can be used by profile server 170 to develop profiles for each user in accordance with the principles of the exemplary disclosed embodiments. Profile 170 can contain graphical elements representing different contexts such as topics which can be associated with a user's profile when displayed.

In an optional embodiment, context server 160 can be implemented within consumption device 105, 110, 115, within social networking service 120, website 130, communication network 140, media service 150, and the like. In an another optional embodiment, profile server 170 can be implemented within consumption device 105, 110, 115, within social networking service 120, website 130, communication network 140, media service 150, and the like.

Figure 2:
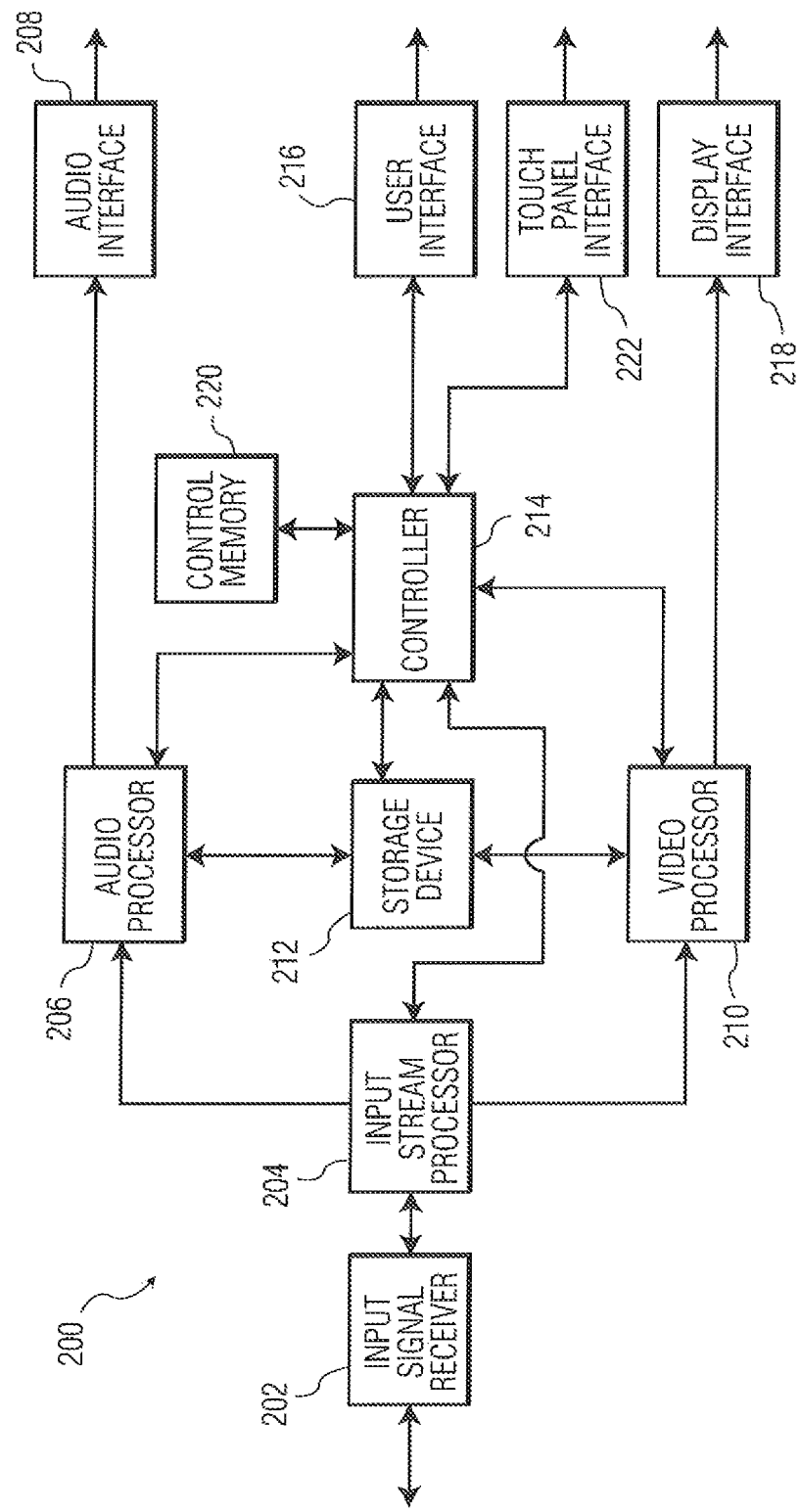
FIG. 2 is a block diagram of an exemplary consumption device in accordance with an embodiment of the present disclosure.

Turning now to FIG. 2, a block diagram of an embodiment of a consumption device 200 is shown. Consumption device 200 can operate similar to the devices such as a computer 120, set top box 130, tablet 140, television 150, phone 160, gateway 170, and the like, described in FIG. 1. The device 200 shown can also be incorporated into other systems including an audio device or a display device. In either case, several components necessary for complete operation of the system are not shown in the interest of conciseness, as they are well known to those skilled in the art.

In the device 200 shown in FIG. 2, the content is received by an input signal receiver 202. The input signal receiver 202 can be one of several known receiver circuits used for receiving, demodulation, and decoding signals provided over one of the several possible networks including over the air, cable, satellite, Ethernet, fiber and phone line networks. The desired input signal can be selected and retrieved by the input signal receiver 202 based on user input provided through a control interface or touch panel interface 222. Touch panel interface 222 can include an interface for a touch screen device. Touch panel interface 222 can also be adapted to interface to a cellular phone, a tablet, a mouse, a high end remote or the like.

The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device or audio amplifier. Alternatively, the audio interface 208 can provide a digital signal to an audio output device or display device using a High-Definition Multimedia Interface (HDMI) cable or alternate audio interface such as via a Sony/Philips Digital Interconnect Format (SPDIF). The audio interface can also include amplifiers for driving one more sets of speakers. The audio processor 206 also performs any necessary conversion for the storage of the audio signals.

The video output from the input stream processor 204 is provided to a video processor 210. The video signal can be one of several formats. The video processor 210 provides, as necessary, a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216 and/or touch panel interface 222. The storage device 212 can be a hard disk drive, one or more large capacity integrated electronic memories, such as static RAM (SRAM), or dynamic RAM (DRAM), or can be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 can be an analog signal interface such as red-green-blue (RGB) or can be a digital interface such as HDMI. It is to be appreciated that the display interface 218 will generate the various screens for presenting the search results in a two dimensional form as will be described in more detail below.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 can interface with search engine 105 for the searching of content and the creation and adjusting of the display of graphical objects representing such content which can be stored or to be delivered via content server 110, described above.

The controller 214 is further coupled to control memory 220 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 can store instructions for controller 214. Control memory can also store a database of elements, such as graphic elements containing content, various graphic elements used for generating a displayed user interface for display interface 218, and the like. Alternatively, the memory can store the graphic elements in identified or grouped memory locations and use an access or location table to identify the memory locations for the various portions of information related to the graphic elements. In addition, various graphic elements can be generated in response to computer instructions interpreted by controller 214 for output to display interface 218. Additional details related to the storage of the graphic elements will be described below. Further, the implementation of the control memory 220 can include several possible embodiments, such as a single memory device or, alternatively, more than one memory circuit communicatively connected or coupled together to form a shared or common memory. Still further, the memory can be included with other circuitry, such as portions of bus communications circuitry, in a larger circuit.

Optionally, controller 214 can be adapted to extract metadata from audio and video media by using audio processor 206 and video processor 210, respectively. That is, metadata that is contained in video signal in the vertical blanking interval, auxiliary data fields associated with video, or in other areas in the video signal can be harvested by using the video processor 210 with controller 214 as to generate metadata that can be used for functions such as generating an electronic program guide, have descriptive information about received video, supporting an auxiliary information service, and the like. Similarly, the audio processor 206 working with controller 214 can be adapted to recognize audio watermarks that can be in an audio signal. Such audio watermarks can then be used to perform some action such as the recognition of the audio signal, security which identifies the source of an audio signal, or perform some other service. Furthermore, metadata to support the actions listed above can come from a network source which are processed by controller 214.

Controller 214 can be also configured to process user interface information and to filter communications and content received from different sources based on the context, subject, topic, and the like of such communications and content where not all of the communications/context received will be displayed based on filtering techniques. For example, if a received communication is from a specific source of a particular context/subject, such a communication can be displayed or further relayed if such the source and subject are specified in user profile information, in accordance with the disclosed principles. Other filtering options can be implemented in accordance with the exemplary embodiments.

Figure 3:
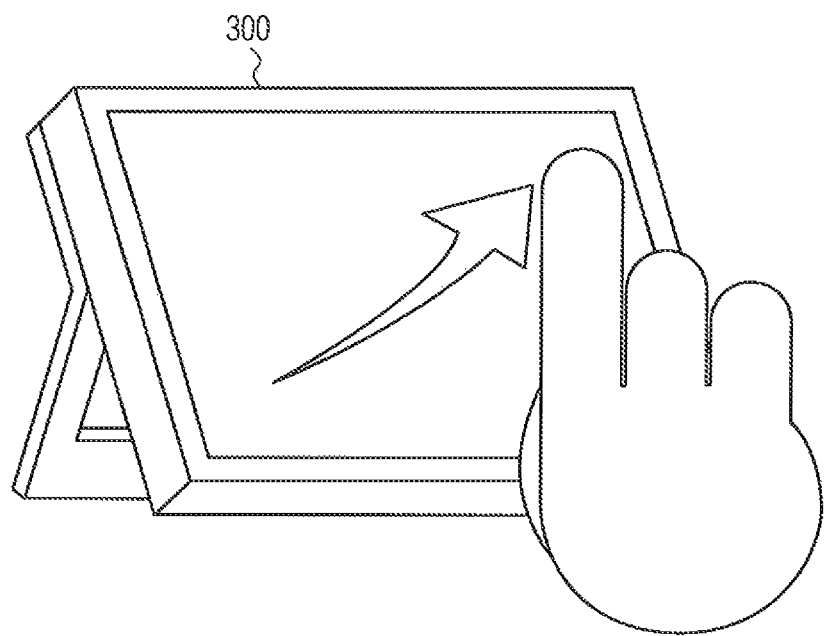
FIG. 3 is a perspective view of an exemplary media device in accordance with an embodiment of the present disclosure.

Turning now to FIG. 3, the user interface process of the present disclosure employs an input device that can be used to express functions, such as fast forward, rewind, etc for generating user input. To allow for this, a tablet or touch panel device 300 on a consumption device (which is the same as the tablet 140 shown in FIG.1 and/or computer 120, set top box 130, television 150, phone 160, and the like) can be interfaced via the user interface 216 and/or touch panel interface 222 of the receiving device 200. The touch panel device 300 allows operation of the receiving device or set top box based on hand movements, or gestures, and actions translated through the panel into commands for the set top box or other control device. In one embodiment, the touch panel 300 can simply serve as a navigational tool to navigate the grid display or means that controls a second device via a user interface. In other embodiments, the touch panel 300 will additionally serve as the display device allowing the user to more directly interact with the navigation through the grid display of content. The touch panel device can be included as part of a remote control device containing more conventional control functions such as activator buttons. The touch panel 300 can also include at least one camera element. Note, various touch panel interface 222, buttons, softkeys, trackballs, stylus, touchpads, and the like can operate as an input interface providing a user the ability to control elements shown as part of user interface 216.

Figure 4:
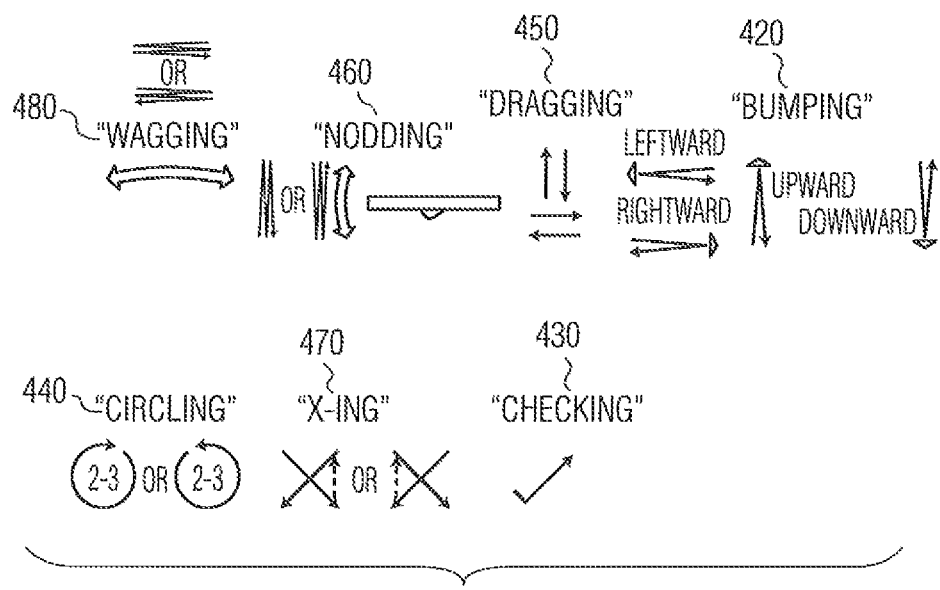
FIG. 4 illustrates an exemplary embodiment of the use of gestures for a sensing controller or touch screen in accordance with the present disclosure.

Turning now to FIG. 4, the use of a gesture sensing controller or touch screen, such as shown, provides for a number of types of user interaction as user input. The inputs from the controller are used to define gestures and the gestures, in turn, define specific contextual commands. The configuration of the sensors (e.g., touch screen sensors and/or inertial sensors such as accelerators and/or gyroscopic sensors) can permit defining movement of a user's fingers on a touch screen or can even permit defining the movement of the controller itself in either one dimension or two dimensions. Two-dimensional motion, such as a diagonal, and a combination of yaw, pitch and roll can be used to define any three-dimensional motion, such as a swing. A number of gestures are illustrated in FIG. 4. Gestures are interpreted in context and are identified by defined movements made by the user.

Bumping 420 is defined by a two-stroke drawing indicating pointing in one direction, either up, down, left or right. The bumping gesture is associated with specific commands in context. For example, in a TimeShifting mode, a left-bump gesture 420 indicates rewinding, and a right-bump gesture indicates fast-forwarding. In other contexts, a bump gesture 420 is interpreted to increment a particular value in the direction designated by the bump. Checking 440 is defined as in drawing a checkmark. It is similar to a downward bump gesture 420. Checking is identified in context to designate a reminder, user tag or to select an item or element. Circling 440 is defined as drawing a circle in either direction. It is possible that both directions could be distinguished. However, to avoid confusion, a circle is identified as a single command regardless of direction. Dragging 450 is defined as an angular movement of the controller (a change in pitch and/or yaw) while pressing a button (virtual or physical) on the tablet 300 (i.e., a "trigger drag"). The dragging gesture 450 can be used for navigation, speed, distance, time-shifting, rewinding, and forwarding. Dragging 450 can be used to move a cursor, a virtual cursor, or a change of state, such as highlighting outlining or selecting on the display. Dragging 450 can be in any direction and is generally used to navigate in two dimensions. However, in certain interfaces, it is preferred to modify the response to the dragging command. For example, in some interfaces, operation in one dimension or direction is favored with respect to other dimensions or directions depending upon the position of the virtual cursor or the direction of movement. Nodding 460 is defined by two fast trigger-drag up-and-down vertical movements. Nodding 460 is used to indicate "Yes" or "Accept." X-ing 470 is defined as in drawing the letter "X." X-ing 470 is used for "Delete" or "Block" commands. Wagging 480 is defined by two trigger-drag fast back-and-forth horizontal movements. The wagging gesture 480 is used to indicate "No" or "Cancel." That is, any of these types of gestures can be used to select to manipulate a graphic object in accordance with the disclosed embodiments.

Depending on the complexity of the sensor system, only simple one dimensional motion or gestures can be allowed. For instance, a simple right or left movement on the sensor as shown here can produce a fast forward or rewind function. In addition, multiple sensors could be included and placed at different locations on the touch screen. For instance, a horizontal sensor for left and right movement can be placed in one spot and used for volume up/down, while a vertical sensor for up and down movement can be place in a different spot and used for channel up and down. In this way specific gesture mappings can be used.

Referring back to FIG. 1, an exemplary embodiment begins with a user denoted as user X who operates a consumption device 105. The user X has friends and acquaintance that user X can link to through a social network service 120 where each friend can use a consumption device 110, 115. In one setting using social network service 120, user X links to other users by sending a "friend" request to other users, whereby the other users will be connected to user X if the "friend" request is accepted. In this current example, user X can be connected to a plurality of other people through the social networking service 120, for example user X connects to a Connected user 1, Connected user 2, Connected user N. Other ways of connecting users together can be utilized in accordance with the principles of the exemplary embodiments Once connected to other users, user X can post pictures, videos, messages, and the like to their account where such messages are transmitted to all of the other friends/acquaintances to which the user X in linked to through social networking service 120. Alternatively, user X can send any of these items uniquely to a single user.

An exemplary embodiment of the present disclosure teaches that when a user X transmits an electronic communication to a first user where the electronic communication is of a particular context, a suggestion is made to user X to send a specific message or content to other connected users, based on the profile information of such connected users. That is, profile server 170 develops a unique profile for users based on a number of criteria such as, but not limited to, a user's age, location, marital status, preferences of the user, what content the user typically posts, identifying by keyword analysis the subject matter of the user, and other information can be used for developing such profiles. In addition, a user profile can be further developed by profile server 170 based upon the profiles of connected users linked to user X.

For example, connected users 1 and 2 each have information in their profile that indicates that they enjoy a specific sports team while connected users 3 and 4 like to receive communications about dogs. The social networking system 120 that operates with context server 160 and profile server 170, in this example, can determine through keyword analysis based on the posts that user X receives that user X likes sports (because user X is connected to connected users 1 and 2) and user X likes dogs as well (based on postings from connected users 3 and 4). This can be accomplished by determining the context of different electronic communications in accordance with the disclosed exemplary embodiments.

Continuing with this example, a larger listing of subjects for different user profiles are shown in TABLE 1:

TABLE 1

|  | Sports | Movies | Dogs | Cats | Food |
|---|---|---|---|---|---|
| User X | X | X | X | X |  |
| Connected User 1 | X | X |  | X |  |
| Connected User 2 | X | X | X |  |  |
| Connected User 3 |  | X | X |  | X |
| Connected User 4 | X | X | X | X |  |

In this present embodiment, user X and connected users 1-4 have a variety of subjects in which they have been identified in having an interest. Such profile information as determined by profile server 170 can be additionally established through demographic information entered in by the users, monitoring what the users do, the topics of the postings that the users send which can be determined via keyword analysis, social network analysis, and the like. The categorization of different contexts can also be performed for websites 130, communication network 140, media service 150, and the like using techniques in accordance with the described techniques above.

From the determination of different topics of electronic communications, a profile for user X can be developed user X can specify for a particular source how relevant the context of communications and content from the source are for the user X. The relevancy can be affected by a user X operating a user interface where the relevancy of the particular source is adjusted using various input or touch interfaces where the size of a particular context and source determines how relevant communications from the source are for a user X.

TABLE 2

|  | Sports | Movies | Dogs | Cats | Food |
|---|---|---|---|---|---|
| User X's profile | .2 | .3 | .15 | .05 | .25 |

The implementation of TABLE 2 shows a sample profile for a user X, where the topics of interest for the user are weighted accordance with different values from 0 to 1, where the aggregate summation of such weights could be equal to 1. In an exemplary embodiment, the weights correlate to how much or many of the electronic communications a user X receives concerning these contexts where 20% of the content concerns sports, 30% concerns movies, 15% is about dogs, 5% concerns cats, and 25% is about food. Other weighting approaches and how electronic messages are affected can be implemented in accordance with the exemplary embodiments. Such profile information can be stored and modified by profile server 170.

Figure 5:
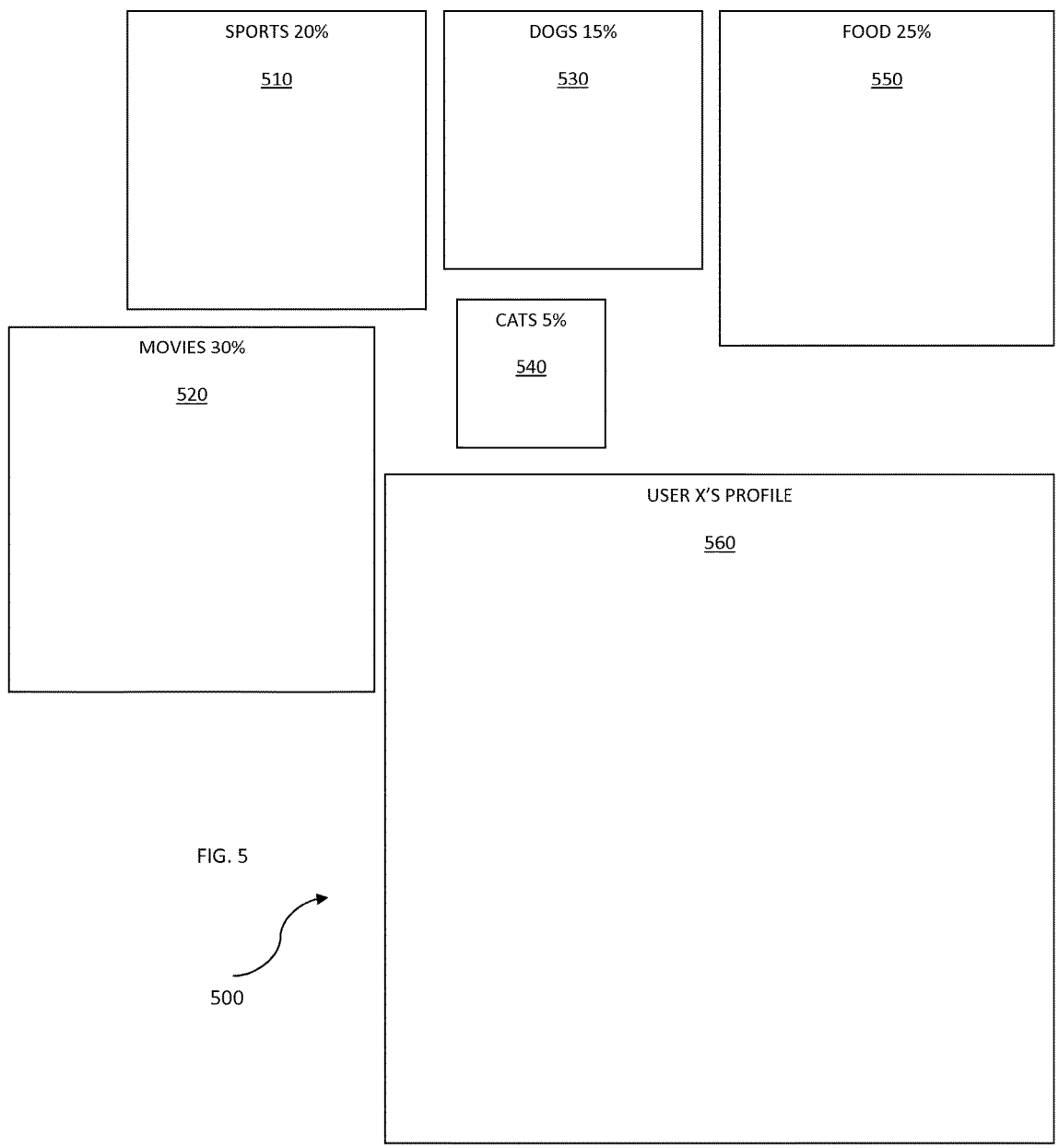
FIG. 5 illustrates an exemplary embodiment of a user interface that is used for adjusting the contexts/subjects used for a user profile in accordance with the present disclosure.

A user interface 500 as shown in FIG. 5 discloses an exemplary embodiment as how weights are assigned to different contexts for a user profile creating a composition for the user profile. Specifically, various contexts sports 510, movies 520, dogs 530, cats 540, and food 550 are presented as different graphical elements where the area of such graphical elements are proportional to the weighting of such contexts, where the total area of a user's profile is shown in 560. For example, sports 510 would represent 20% of the area of user profile 560, movies 520 represents 30% of the area of user profile 560, dogs 530 represents 15% of the area of user profile 560, cats 540 represents 5% of the area of user profile 560, and food 550 represents 25% of the area of user profile 560.

Figure 6:
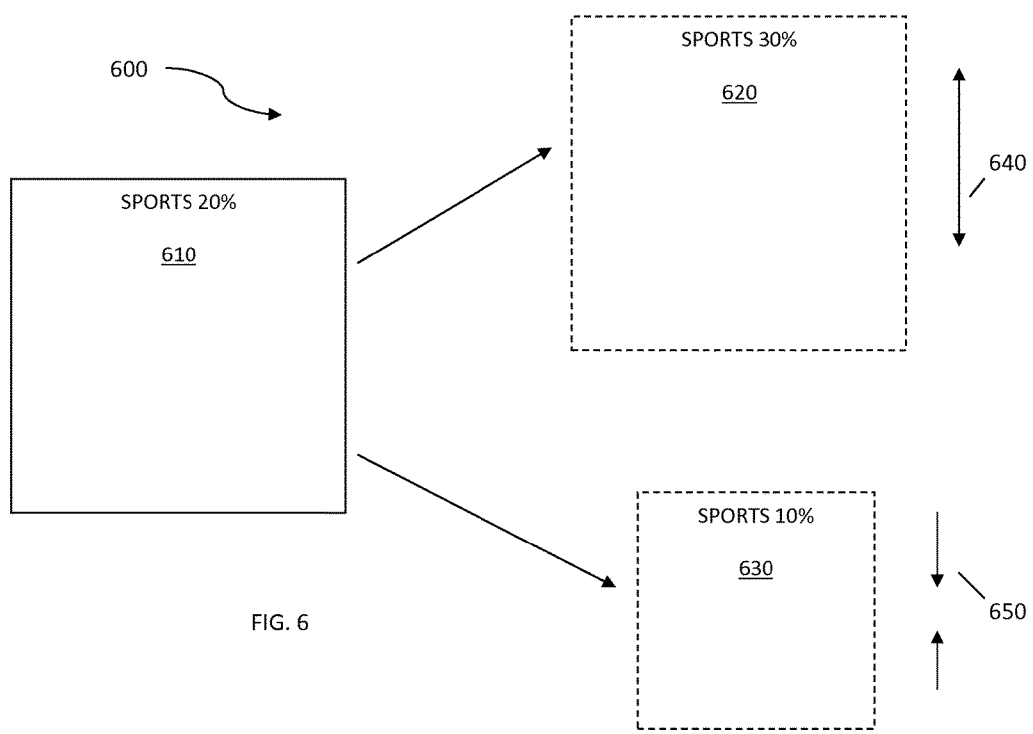
FIG. 6 illustrates an exemplary embodiment of a user interface that is used for adjusting the contexts/subjects used for a user profile in accordance with the present disclosure.

The various graphical elements of a context can be manipulated by a user in accordance with the principles of user interface 600 shown in FIG. 6. For example, sports context 610 as displayed could represent 20% of a user profile. The graphical element can be made larger in sports context 620 by expanding such an element in view of user input. The result of such an expansion would now have sports context 620 representing 30% of the electronic messages/content received for a user profile. A graphical element 610 an also be reduced in response to a user input into a form shown for sports context 630, where the reduced element represents 10% of a user's profile. Other approaches for expanding and reducing graphical elements which correspond to contexts can be used in accordance with the principles of the present invention.

By using a touch interface, a graphical element can be expanded by a user enlarging such a graphical element by placing two fingers and moving such fingers in an outward direction as shown by arrows 640. A graphical element using a touch interface can also be reduced by using two fingers to pinch a graphical element in a direction as shown with arrows 650.

Figure 7:
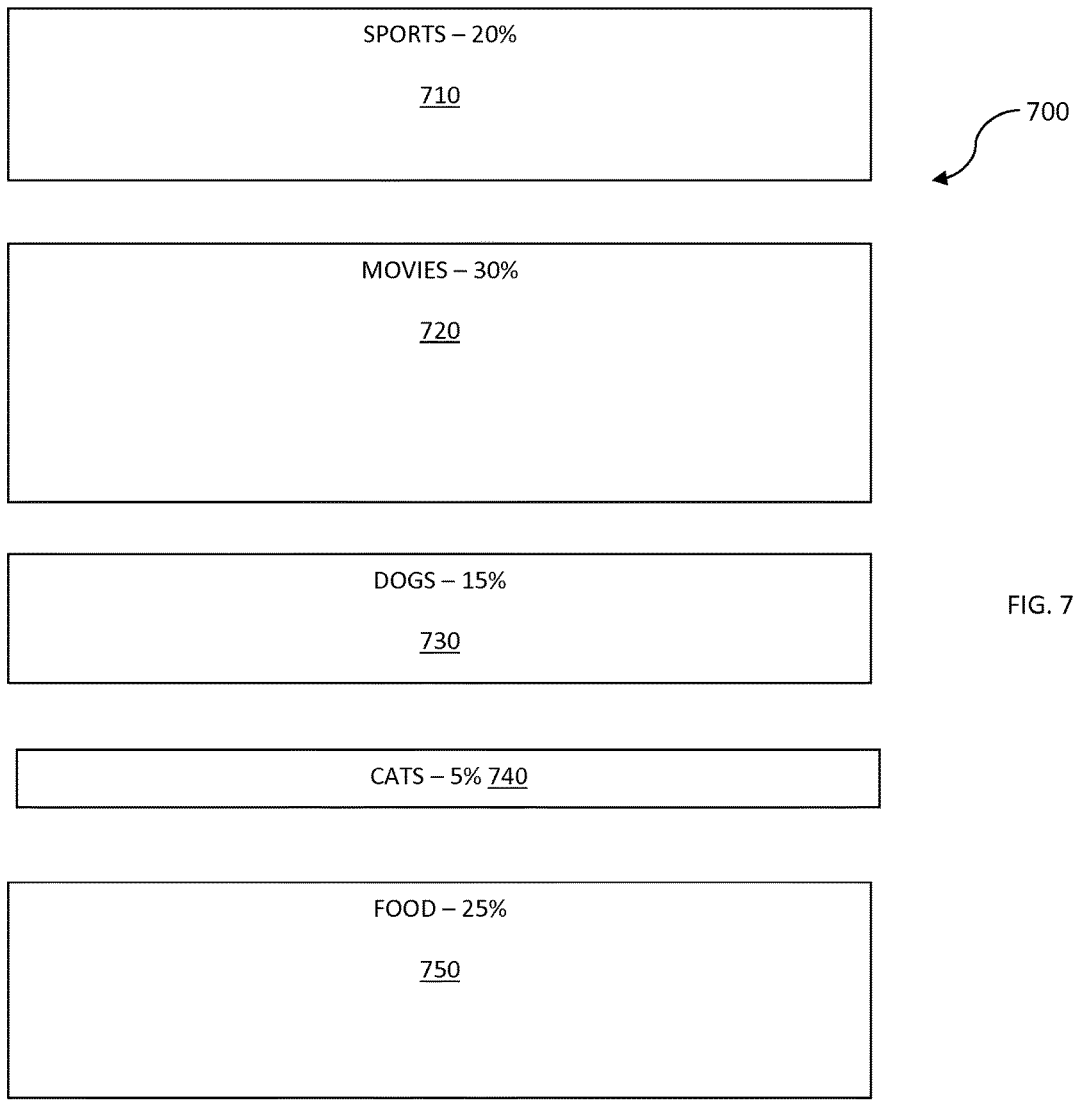
FIG. 7 illustrates an exemplary embodiment of a user interface that is used for represent the context/subjects used for a user profile in accordance with the present disclosure.

FIG. 7 represents an exemplary embodiment of a user interface 700 where various graphical elements represent the different contexts in a user profile. In this embodiment, the heights of the graphical elements change in proportion to the weighting of the corresponding context while the widths stay the same. Hence, graphical element 710 that comports to sports represents 20% of a user profile, graphical element 720 that corresponds to movies represents 30% of a user profile, graphical element 730 which relates to dogs represents 15% of a user profile, graphical element 740 for cats represents 5% of a user profile, and the context food which corresponds to graphical element 750 represents 25% of a user profile. Other embodiments can be implemented in accordance with the exemplary principles provided.

TABLE 3

|  | Sports (.2) | Movies (.3) | Dogs (.15) | Cats (.05) | Food (.25) |
|---|---|---|---|---|---|
| Connected User 1 | .2 | .1 |  |  | .7 |
| Connected User 2 | .3 | .1 | .33 |  |  |

TABLE 3-continued

|  | Sports (.2) | Movies (.3) | Dogs (.15) | Cats (.05) | Food (.25) |
| --- | --- | --- | --- | --- | --- |
| Connected User 3 |  | .1 | .33 |  | .3 |
| Connected User 4 | .1 | .1 | .33 | .3 |  |
| Website 1 | .2 |  |  |  |  |
| Website 2 |  | .5 |  |  |  |
| Website 3 |  |  | .1 |  | .7 |
| Media Service 1 | .2 |  |  |  |  |

TABLE 3 is a further elaboration as to how the sources of electronic communications and related content are to be treated relative to user X's profile and the contexts in such a profile to form a composition of content and electronic communications. Respective weights are assigned to the contexts of electronic communications from different sources such as connected user 1, connected user 2, connected user 3, connected user 4, website 1, website 2, website 3, and media service 1. The relevancy of the electronic communications from such sources in view of the context of the electronic messages is weighted from a value 0 to 1, where such a weighting can be, for example, the frequency of messages from such sources. The aggregated summation of the weights for a particular topic could be equal to 1. In an exemplary embodiment, if there are 100 messages and/or pieces of content about a particular context such as "CATS", 70% of the messages/content would come from connected user 1 while 30% of the messages/content would come from connected user 4. The profiles stored in profile server 170 are then changed in accordance with such operations. Other weighting techniques and how to use such weightings for a profile can be used in accordance with the exemplary embodiments.

Figure 8:
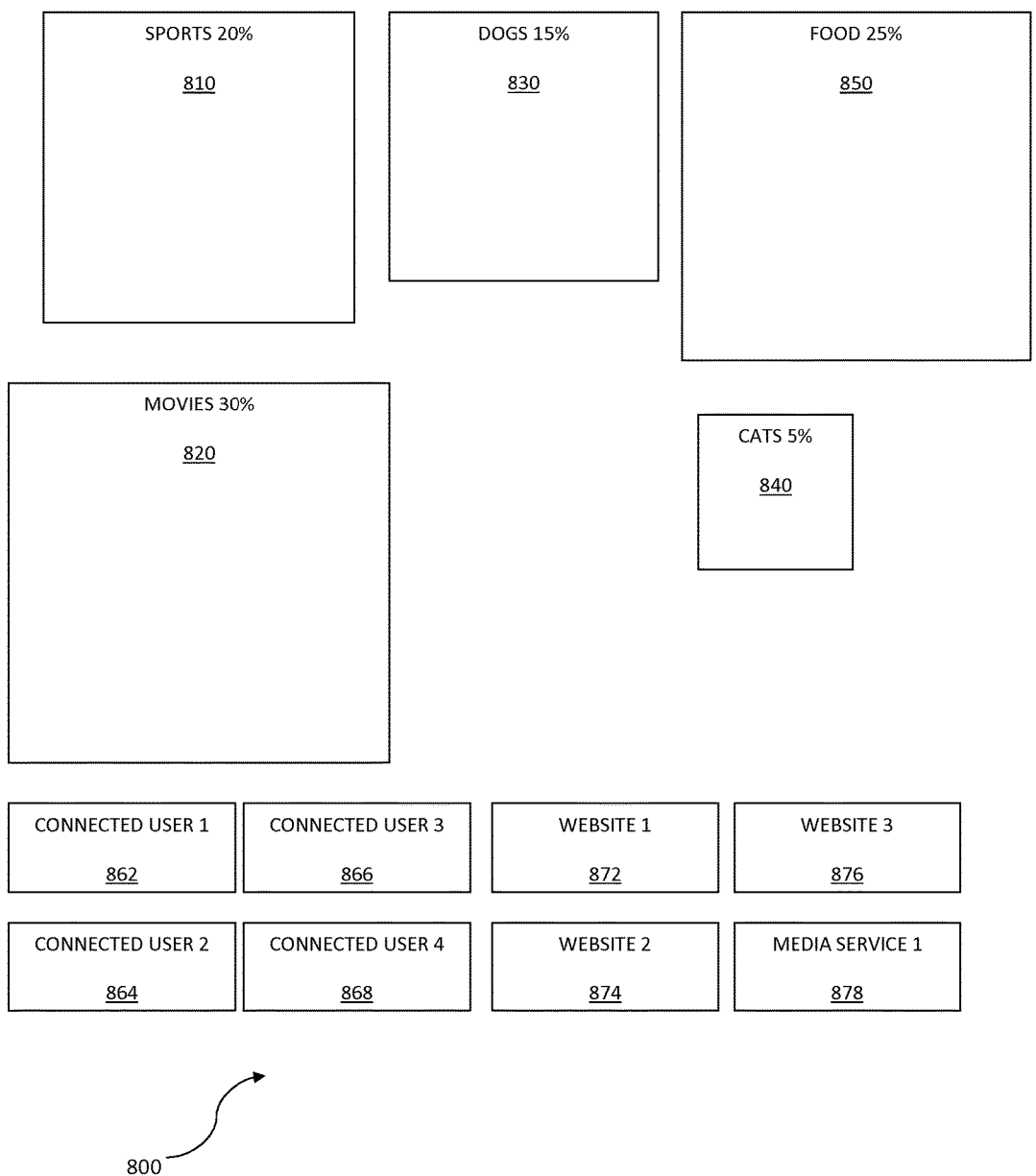
FIG. 8 illustrates an exemplary embodiment of a user interface that is used for associating context/subjects with various sources of content and communications in accordance with the present disclosure.

FIG. 8 is an exemplary embodiment of a user interface 800 that is used to associated various graphical elements that represents contexts to graphical elements that represent various users and sources of content and electronic communications. The various contexts shown as graphical elements are sports 810, movies 820, dogs 830, cats 840, and food 850. Likewise, various sources of content and electronic communications are represented as graphical elements such as connected user 1 (862), connected user 2 (864), connected user 3 (866), connected user 4 (868), website 1 (872), website 2 (874), website 3 (876), and media service 1 (878).

Figure 9:
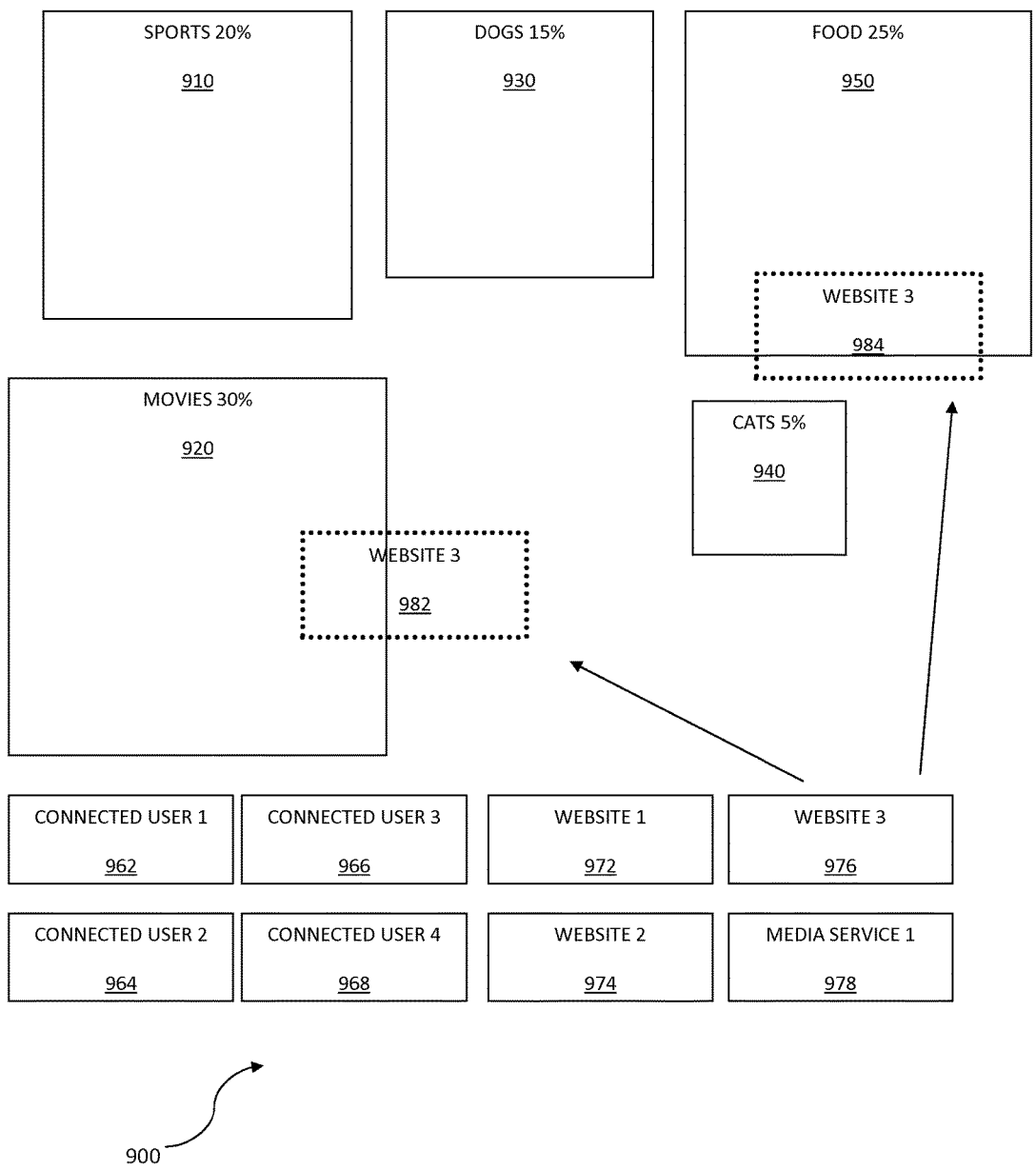
FIG. 9 illustrates an exemplary embodiment of a user interface that is used for associating contexts/subjects with various sources of content and communications in accordance with the present disclosure.

The graphical elements representing sources can be manipulated via user input as shown in a manner in FIG. 9, representing an exemplary embodiment of a use interface 900, to have such sources associated with particular context. For example, a graphical element 976 representing website 3 is dragged using user input on top of the graphical element 920 representing movies. This operation is shown by graphical element 982 that is shown overlapping graphical element 920. Website 3 is also shown to be associated with a context 950 by having a graphical element 984 dragged on top of the graphical element 950.

Figure 10:
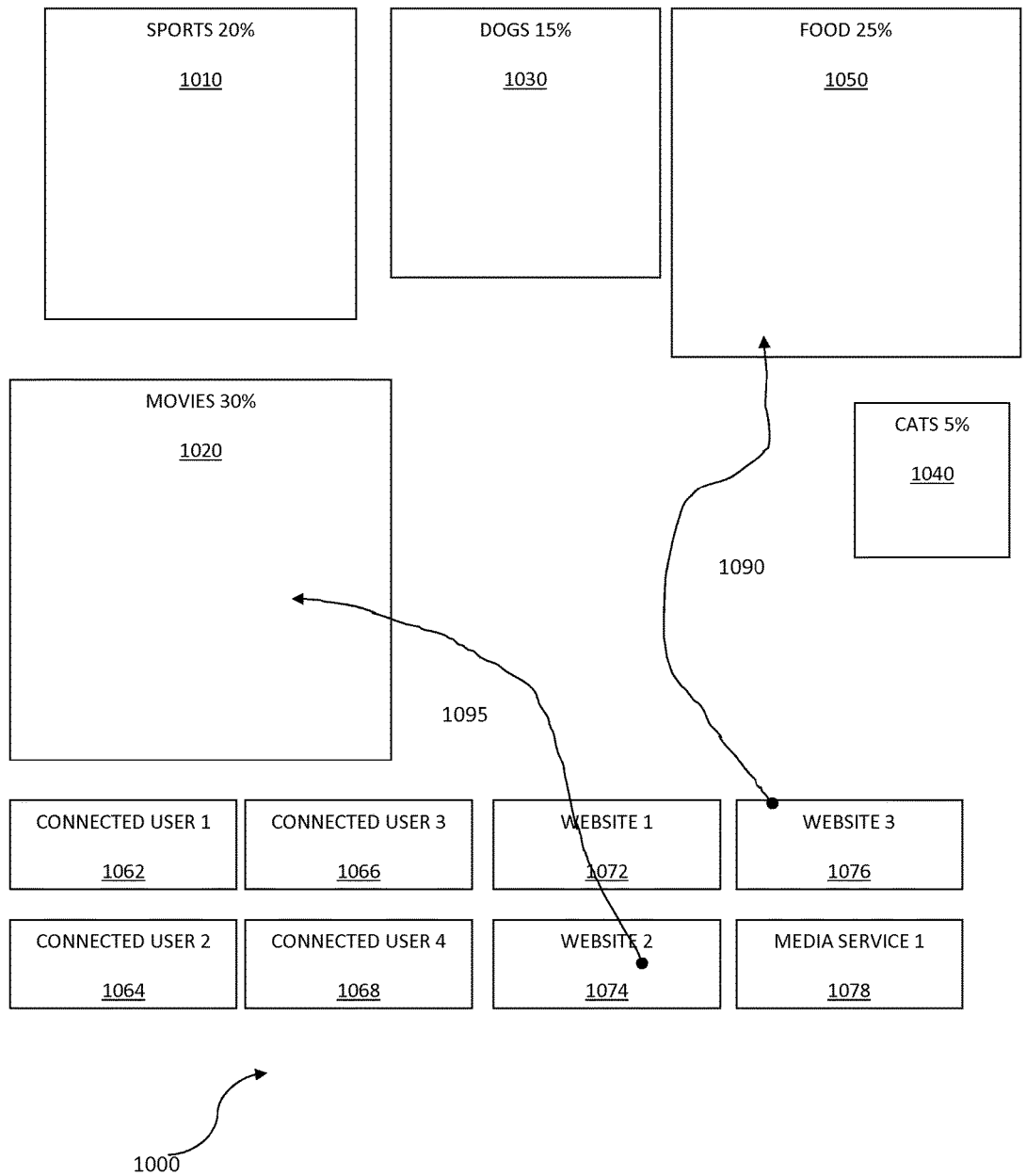
FIG. 10 illustrates an exemplary embodiment of a user interface that is used for associating contexts/subjects with various sources of content and communications in accordance with the present disclosure.

FIG. 10 discloses a user interface 1000 that is also used to associate contexts with different sources in accordance with an exemplary embodiment. A user using with interface 1000 can draw lines using an input device, finger, stylus, and the like to associate a graphical element representing a source and a graphical element representing a context. For example, graphical element 1076 representing website 3 has a line 1090 drawn to a graphical element 1050 representing food. Hence, a user profile will reflect that a user wants to receive electronic communications and/or content from website 3 about food. Similarly, in response to a line 1095 being drawing from a graphical element 1074 representing website 2 to a graphical element 1020 representing movies, a user profile will reflect that a user wants to receive electronic communications and/or content from website 2 that concerns movies. Other mechanisms can be used for having such associations made between sources and contexts in accordance with exemplary embodiments of the invention.

Figure 11:
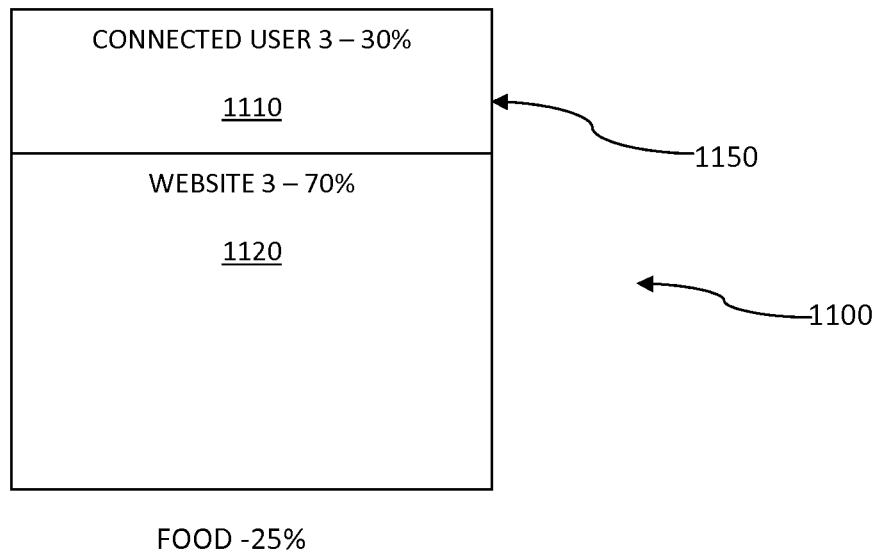
FIG. 11 illustrates an exemplary embodiment of a user interface that is used for adjusting the various sources for a specific context/subject in accordance with the present disclosure.
Figure 12:
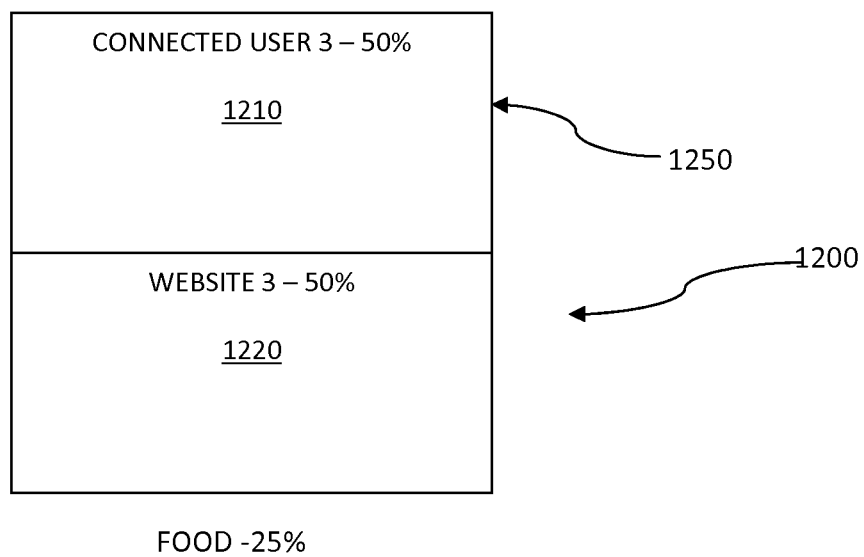
FIG. 12 illustrates an exemplary embodiment of a user interface that is used for adjusting the various sources for a specific context/subject in accordance with the present disclosure.

FIG. 11 presents an exemplary embodiment of a user interface 1100 that is used to allocate weights to a context for a user profile. Specifically, for a subject food that comports to graphic element 1150, 30% of the profile will have content/electronic communications about food come from connected user 3 which comports to element 1110 while 70% of content/electronic communications about food will come from website 3 that comports to graphic element 1120. FIG. 12 presents an exemplary embodiment of a user interface 1200, the weights of the sources of content/electronic communications change in response to user input for a context food 1250. That is, the percentage of content/electronic communications changes from connected user 3 from 30% (1110) to 50% (1210). While, the profile will have amount of content/electronic communications from website 3 change from the 70% as shown by graphic element 1120 to 50% shown in graphic element 1220. That is, when a graphical representation of a source, context, and the like is adjusted in response to user input, the associated elements of a user profile are adjusted accordingly.

Figure 13:
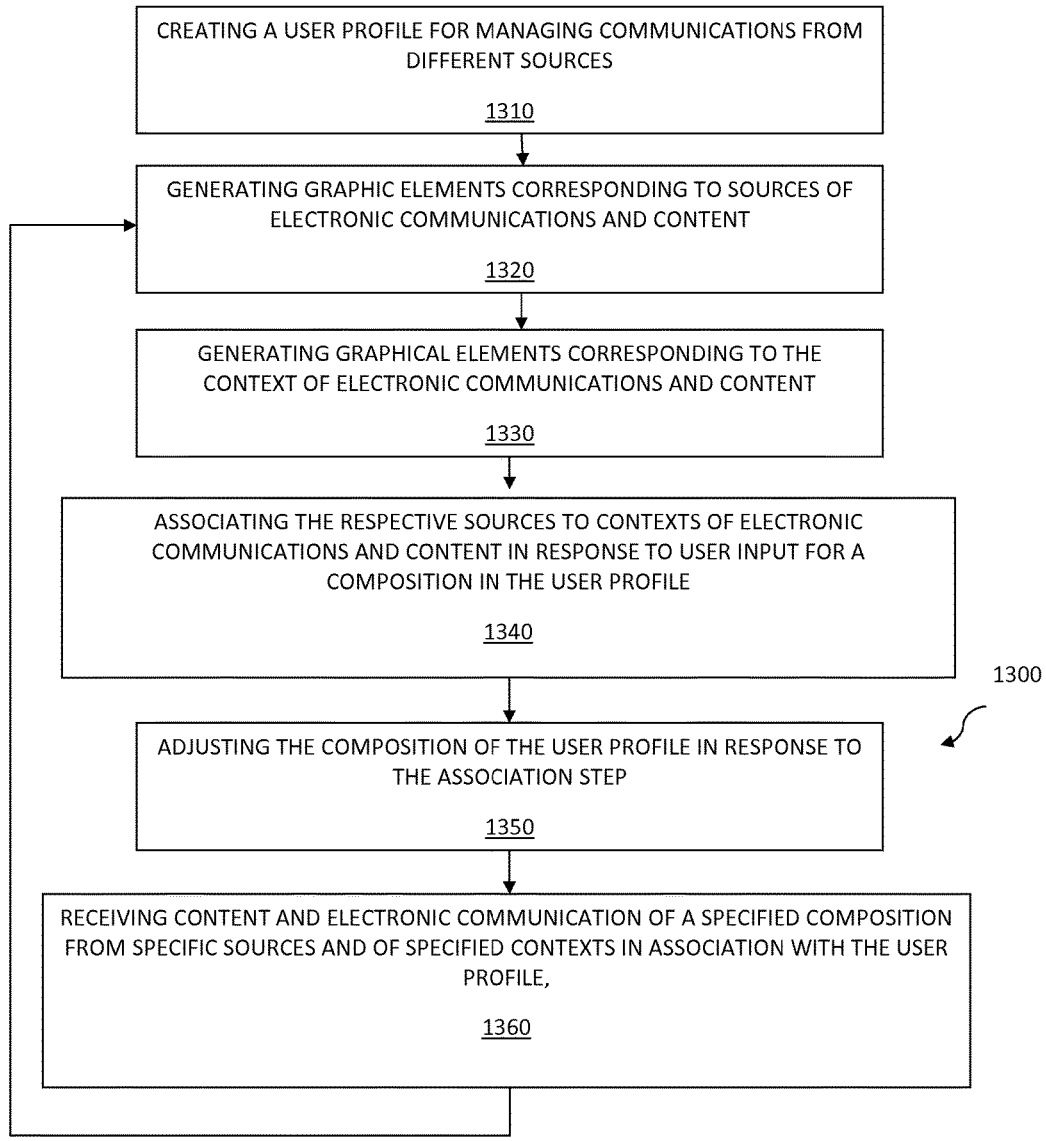
FIG. 13 illustrates a flow chart of a method that provides a user profile that is used for managing the associations of different contexts/subjects of electronic communications and content from different sources in accordance with the present disclosure.

FIG. 13 discloses a flowchart 1300 for implementing method that provides a user profile that can be used to manage the associations of different contexts of electronic communications and content from different sources in accordance with an exemplary embodiment. In step 1310, a user profile is created. Such a profile can be generated with a user interface, using implicit methods, using explicit methods, and/or a combination of these approaches in accordance with the disclosed exemplary embodiments for profile server 170. Such a user profile is used to manage the context/topics of communications and content received from different sources. Also, the user profile can be used to control the composition of topics received from different sources in accordance with the principles of the exemplary embodiments.

In step 1320, a user interface can be generated that has graphical elements corresponding to sources of electronic communications and content. Such sources can be other users, websites, communication networks, consumption devices, social networks, media services, and the like. For example, a newspaper article from a website, a message from a user, and a video all are examples of content from potential sources in an exemplary embodiment.

In step 1330, a user interface can be generated which shows graphical elements that comport to sources of electronic communications and content. That is, a user interface can show various graphical elements such as shapes, pictures, graphics, bitmaps, vector images, and the like which are associated with different contexts/subjects. For example, a graphical element of a picture of a baseball can represent the subject baseball while a graphical element labeled "sports" can represent the topic of sports as well. Other approaches can be used in accordance with the principles of the invention.

In step 1340, a user interface is used to manage the associations of selected contexts/subjects with different sources of electronic communications and content in response to user input. Such associations can be performed in accordance with the disclosed exemplary embodiments where a specific context is associated with a specific source. The weightings for a specific context, source, and a combination thereof can also be performed during step 1340 where such weighting can be used to affect the composition (amount) of content, contexts, and sources for a user profile. A composition can also be used to affect the frequency of how often communications from different sources are displayed when such communications concern the same subject/context. Composition information can also be used for determining how frequently communications/content of different subjects can be displayed. For example, communications concerning dogs are displayed 80% of the time while communications concerning sports are displayed the remaining 20% of the time. Other examples of how composition information affects the display of communications/context can be implemented in accordance with the disclosed principles.

In step 1350, a user profile is automatically adjusted for profile server 170 in response to the outputs of step 1340.

In step 1360, the disclosed management method can cause a user to receive content and electronic messages in response to the determined user profile. That is, a consumption device 105 can filter the content and messages that are received in accordance with the exemplary principles. A consumption device 105 can also communicate such preferences to different sources of content and electronic communications so the filtering is done by the sources themselves instead of having a consumption device perform such operations. Other approaches for content and electronic message delivery can be performed in accordance with the disclosed embodiments.

It should be understood that the elements shown in the figures can be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for informational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes that can be substantially represented in computer readable media and so executed by a computer or processor, whether or not such computer or processor is explicitly shown. The computer readable media and code written on can be implemented in a transitory state (signal) and a non-transitory state (e.g., on a tangible medium such as CD-ROM, DVD, Blu-Ray, Hard Drive, flash card, or other type of tangible storage medium).

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although embodiments which incorporate the teachings of the present disclosure have been shown and described in detail herein, those skilled in the art can readily devise many other varied embodiments that still incorporate these teachings. It is noted that modifications and variations can be made by persons skilled in the art in light of the above teachings.

The invention claimed is:

1. A method for managing communications comprising:
receiving a plurality of communications, said communications being associated to corresponding contexts;
determining a user profile comprising a plurality of contexts and a corresponding weighting value for said plurality of contexts, the weighting values being modified graphically through a user interface allowing to modify the proportions of the weighting values by user input adjusting a size of graphical elements representing the plurality of contexts of the user profile;
associating to said context a plurality of communication sources and determining a corresponding weighting value for said plurality of communication sources,
wherein the associating and determining steps are performed graphically through the user interface allowing the user to establish a graphical relation between the graphical elements representing the plurality of contexts of the user profile and graphical elements representing the plurality of communication sources;
displaying the graphical associations between the communication sources and the contexts wherein a graphical element representing a context includes the graphical elements representing the associated sources; and
allowing to modify the proportions of communications received from the associated communication sources by user input adjusting a size of the graphical elements representing the plurality of associated communication sources for the context; and
selecting, among communications, the communications corresponding to said user profile wherein the quantity of communications selected for the plurality of contexts is proportional to the weighting for the context and the associated communication sources;

outputting the selected communications; and controlling a display frequency of the selected communications based on at least the weighting of the context, the weighting of the associated communication sources or a combination thereof.

2. The method of claim 1, wherein said context is at least one of a topic, a subject, and a category.

3. The method of claim 1, further comprising:

generating information for display according to said selected communications corresponding to said user profile.

4. The method of claim 1, wherein associating said communications to corresponding contexts further comprises:

determining a context of the communications by identifying keywords;

associating pronouns with the identified keywords to generate accurate contextual count for the identified keyword;

generate weights for the identified keywords; and generate graphical elements in proportion to weighted identified keywords.

5. An apparatus comprising one or more processors that:

receives a plurality of communications, said communications being associated to corresponding contexts;

determines a user profile comprising a plurality of contexts and a corresponding weighting value for said plurality of contexts, the weighting values being modified graphically through a user input interface allowing to modify the proportions of the weighting values by adjusting a size of graphical elements representing the plurality of contexts of the user profile;

associates to said context a plurality of communication sources and determines a corresponding weighting value for said plurality of communication sources, wherein the associating and determining steps are performed graphically through the user interface allowing the user to establish a graphical relation between the graphical elements representing the plurality of contexts of the user profile and graphical elements representing the plurality of communication sources;

displays the graphical associations between the communication sources and the contexts wherein a graphical element representing a context includes the graphical elements representing the associated sources; and allow modifying the proportions of communications received from the associated communication sources by user input adjusting a size of the graphical elements representing the plurality of associated communication sources for the context; and selects, among communications, the communications corresponding to said user profile wherein the quantity of communications selected for the plurality of contexts is proportional to the weighting for the context and the associated communication sources;

generates information for display according to the selected communications; and controls a display frequency of the selected communications based on at least the weighting of the context, the weighting of the associated communication sources or a combination thereof.

6. The apparatus of claim 5, wherein the one or more processors further:

determines a context of the communications by identifying keywords;

associates pronouns with the identified keywords to generate accurate contextual count for the identified keyword;

generates weights for the identified keywords; and generates graphical elements in proportion to weighted identified keywords.

7. The apparatus of claim 5, wherein said context is at least one of a topic, a subject, and a category.

8. The apparatus of claim 5, further comprising: generating information for display according to said selected communications corresponding to said user profile.

* * * * *